(12) United States Patent
Patwardhan et al.

(10) Patent No.: US 9,036,496 B2
(45) Date of Patent: May 19, 2015

(54) DEVICES AND METHODS FOR FACILITATING OVERHEAD MESSAGE UPDATES IN WIRELESS COMMUNICATIONS SYSTEMS

(71) Applicant: Qualcomm Incorporated, San Diego, CA (US)

(72) Inventors: Ravindra Manohar Patwardhan, San Diego, CA (US); Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 13/734,187

(22) Filed: Jan. 4, 2013

(65) Prior Publication Data
US 2013/0176942 A1 Jul. 11, 2013

Related U.S. Application Data

(60) Provisional application No. 61/584,768, filed on Jan. 9, 2012.

(51) Int. Cl.
*G01R 31/08* (2006.01)
*H04W 4/12* (2009.01)
*H04W 52/02* (2009.01)

(52) U.S. Cl.
CPC ............ *H04W 4/12* (2013.01); *H04W 52/0254* (2013.01)

(58) Field of Classification Search
CPC .................................................. H04W 52/0254
See application file for complete search history.

(56) References Cited

U.S. PATENT DOCUMENTS

| 5,392,287 A | 2/1995 | Tiedemann, Jr. et al. |
| 5,404,355 A | 4/1995 | Raith |
| 6,889,067 B2 | 5/2005 | Willey |

(Continued)

FOREIGN PATENT DOCUMENTS

WO 2010127494 A1 11/2010

OTHER PUBLICATIONS

International Search Report and Written Opinion—PCT/US2013/020861—ISA/EPO—May 2, 2013.
Partial International Search Report—PCT/US2013/020861—ISA/EPO—Mar. 13, 2013.

(Continued)

*Primary Examiner* — Robert Wilson
(74) *Attorney, Agent, or Firm* — QUALCOMM IP Department; James Hunt Yancey, Jr.

(57) ABSTRACT

Access terminals are adapted to facilitate reception of overhead messages. According to one example, an access terminal can determine whether it is at least substantially stationary. The access terminal may receive one or more sequence numbers corresponding to a subsequent overhead message. In response to being at least substantially stationary, the access terminal can ignore the subsequent overhead message when the corresponding sequence numbers are the same as stored sequence numbers corresponding to a previously obtained overhead message, even when the previously obtained overhead message is more than six hundred seconds old. According to another example, a network node may transmit an overhead message including a corresponding sector indicator and sequence numbers. When the sector indicator and the sequence numbers are the same as a previously received and stored sector indicator and sequence numbers, the access terminal can ignore the overhead message. Other aspects, embodiments, and features are also included.

30 Claims, 9 Drawing Sheets

(56) References Cited

U.S. PATENT DOCUMENTS

| | | | |
|---|---|---|---|
| 7,483,699 B2 | 1/2009 | Karmi et al. | |
| 7,961,708 B2* | 6/2011 | Li et al. | 370/350 |
| 2006/0268768 A1 | 11/2006 | Harris et al. | |
| 2007/0025317 A1* | 2/2007 | Bolinth et al. | 370/347 |
| 2008/0159202 A1* | 7/2008 | Hang | 370/324 |
| 2008/0205363 A1* | 8/2008 | Falk et al. | 370/338 |
| 2009/0247156 A1* | 10/2009 | Sampath et al. | 455/434 |
| 2009/0290502 A1* | 11/2009 | Tinnakornsrisuphap et al. | 370/252 |
| 2010/0067485 A1 | 3/2010 | Rezaiifar et al. | |
| 2010/0142365 A1 | 6/2010 | Richardson et al. | |
| 2011/0013598 A1 | 1/2011 | Jang et al. | |
| 2013/0176942 A1* | 7/2013 | Patwardhan et al. | 370/328 |

OTHER PUBLICATIONS

Chapter II Demand and Article 34 Amendments with Response to Written Opinion; Sep. 27, 2013; PCT/US2013/020861.

Written Opinion of the International Preliminary Examining Authority; International Preliminary Examining Authority; Jan. 24, 2014; PCT/US2013/020861.

Response to Second Written Opinion; Mar. 10, 2014; PCT/US2013/020861.

Additional response to the Jan. 24, 2014 Written Opinion ($2^{nd}$ WO) following Examiner Interview on Mar. 26, 2014; PCT/US2013/020861.

Notification of Transmittal of the International Preliminary Report on Patentability; International Preliminary Examining Authority; May 30, 2014; PCT/US2013/020861.

* cited by examiner

DEVICES AND METHODS FOR FACILITATING OVERHEAD MESSAGE UPDATES IN WIRELESS COMMUNICATIONS SYSTEMS

PRIORITY CLAIM

The present application for patent claims priority to Provisional Application No. 61/584,768 entitled "Devices, Systems, and Methods to Reduce Overhead Updates In Wireless Communication Systems" filed Jan. 9, 2012, and assigned to the assignee hereof and hereby expressly incorporated by reference herein as if fully set forth below and for all applicable purposes.

TECHNICAL FIELD

The technology discussed in this patent application relates generally to wireless communications, and more specifically to methods and devices for facilitating overhead message updates for access terminals operating in a wireless communications system.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Multiple types of devices are adapted to utilize such wireless communications systems. Such devices may be generally referred to as access terminals. Often access terminals are adapted for mobility, such that the access terminal can move throughout a geographic region while maintaining access to the wireless communications system. On the other hand, some access terminals may experience little to no change in location. Some examples of access terminals that experience little to no change in location include access terminals adapted for machine-to-machine (M2M) communications (also sometimes referred to as machine-type communication or MTC). An M2M adapted access terminal may include an access terminal that is adapted to operate at least substantially without user interaction.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various types of access terminals often operate on a limited power source, such as a battery. Accordingly, features may be desirable to improve the life of these limited power sources. Various examples and implementations of the present disclosure facilitate power conservation by optimizing overhead update procedures in wireless communications systems.

According to at least one aspect of the present disclosure, access terminals may facilitate power conservation by optimizing overhead update procedures. According to one or more examples, access terminals may include a communications interface and a storage medium. The communications interface and the storage medium may be coupled to a processing circuit (e.g., a controller or processor). The storage medium may include overhead message information including at least one sequence number associated with a preceding overhead message. The processing circuit may be adapted to determine that the access terminal is at least substantially stationary. One or more subsequent sequence numbers may be received via wireless communication. The subsequent sequence number(s) may/can be associated with a subsequent overhead message transmitted after the preceding overhead message. The processing circuit may be adapted to ignore the subsequent overhead message when the at least one subsequent sequence number is the same as the at least one sequence number stored in the storage medium. In some scenarios, this can occur after a determination that the access terminal is at least substantially stationary.

According to one or more further examples, access terminals may include a communications interface and a storage medium. These components can be coupled to a processing circuit. The storage medium may include a sector indicator corresponding to a preceding overhead message, and at least one sequence number corresponding to the preceding overhead message. The processing circuit may be adapted to receive, via the communications interface, a subsequent sector indicator and at least one subsequent sequence number, each corresponding to a subsequent overhead message. When the subsequent sector indicator is the same as the sector indicator stored in the storage medium, and when the at least one subsequent sequence number is the same as the at least one sequence number stored in the storage medium, the processing circuit may be adapted to ignore the subsequent overhead message.

Further aspects of the present disclosure provide methods operational on an access terminal and/or access terminals including means to perform such methods. One or more examples of such methods may include determining that the access terminal is at least substantially stationary. Information associated with a preceding overhead message may be stored. The information may include at least one sequence number corresponding to the preceding overhead message. One or more subsequent sequence numbers corresponding to a subsequent overhead message may subsequently be received. In response to determining that the access terminal is at least substantially stationary, the subsequent overhead message may be ignored when the at least one corresponding subsequent sequence number is the same as the at least one stored sequence number.

One or more further examples of such methods may include obtaining a subsequent sector indicator and at least one subsequent sequence number, each corresponding to a subsequent overhead message. A determination may be made whether the subsequent sector indicator is the same as a stored sector indicator, and whether the at least one subsequent sequence number is the same as at least one stored sequence number. When the subsequent sector indicator is the same as the stored sector indicator, and when the at least one subsequent sequence number is the same as the at least one stored sequence number, the subsequent overhead message may be ignored.

Still further aspects include computer-readable storage mediums comprising programming operational on a computer, such as an access terminal. According to one or more examples, such programming may be adapted for causing a computer to determine an access terminal to be at least substantially stationary. Information associated with a preceding overhead message may also be stored, where the information includes a sequence number associated with the preceding overhead message. The programming may further be adapted for causing a computer to ignore a subsequent overhead message when a subsequent sequence number associated with the subsequent overhead message is the same as the stored sequence number, and when the access terminal is determined to be at least substantially stationary.

According to one or more additional examples, such programming may be adapted for causing a computer to obtain a subsequent sector indicator and at least one subsequent sequence number, each corresponding to a subsequent overhead message. The programming may further be adapted for causing a computer to determine whether the subsequent sector indicator is the same as a stored sector indicator, and whether the at least one subsequent sequence number is the same as at least one stored sequence number. The programming may additionally be adapted for causing a computer to ignore the subsequent overhead message when the subsequent sector indicator is the same as the stored sector indicator, and when the at least one subsequent sequence number is the same as the at least one stored sequence number.

According to at least one aspect of the present disclosure, network nodes may facilitate power conservation by optimizing overhead update procedures. According to one or more examples, such network nodes may include a communications interface and a storage medium each coupled with a processing circuit. The processing circuit may be adapted to obtain a message including a sector indicator adapted to distinguish the message from messages associated with another sector, and transmit the message via the communications interface.

Yet further aspects of the present disclosure provide methods operational on a network node and/or network nodes including means to perform such methods. One or more examples of such methods may include obtaining a message comprising a sector indicator adapted to distinguish the message from messages associated with another sector, and transmit the obtainer message.

Still further aspects include computer-readable storage mediums comprising programming operational on a computer, such as a network node. According to one or more examples, such programming may be adapted for causing a computer to generate a message comprising a sector indicator adapted to distinguish the message from messages associated with another sector, and to transmit the generated message.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for CDMA (e.g., CDMA 2000) and 3rd Generation Partnership Project 2 (3GPP2) 1x protocols and systems, and related terminology may be found in much of the following description. However, those of ordinary skill in the art will recognize that one or more aspects of the present disclosure may be employed and included in one or more other wireless communication protocols and systems.

Figure 1:
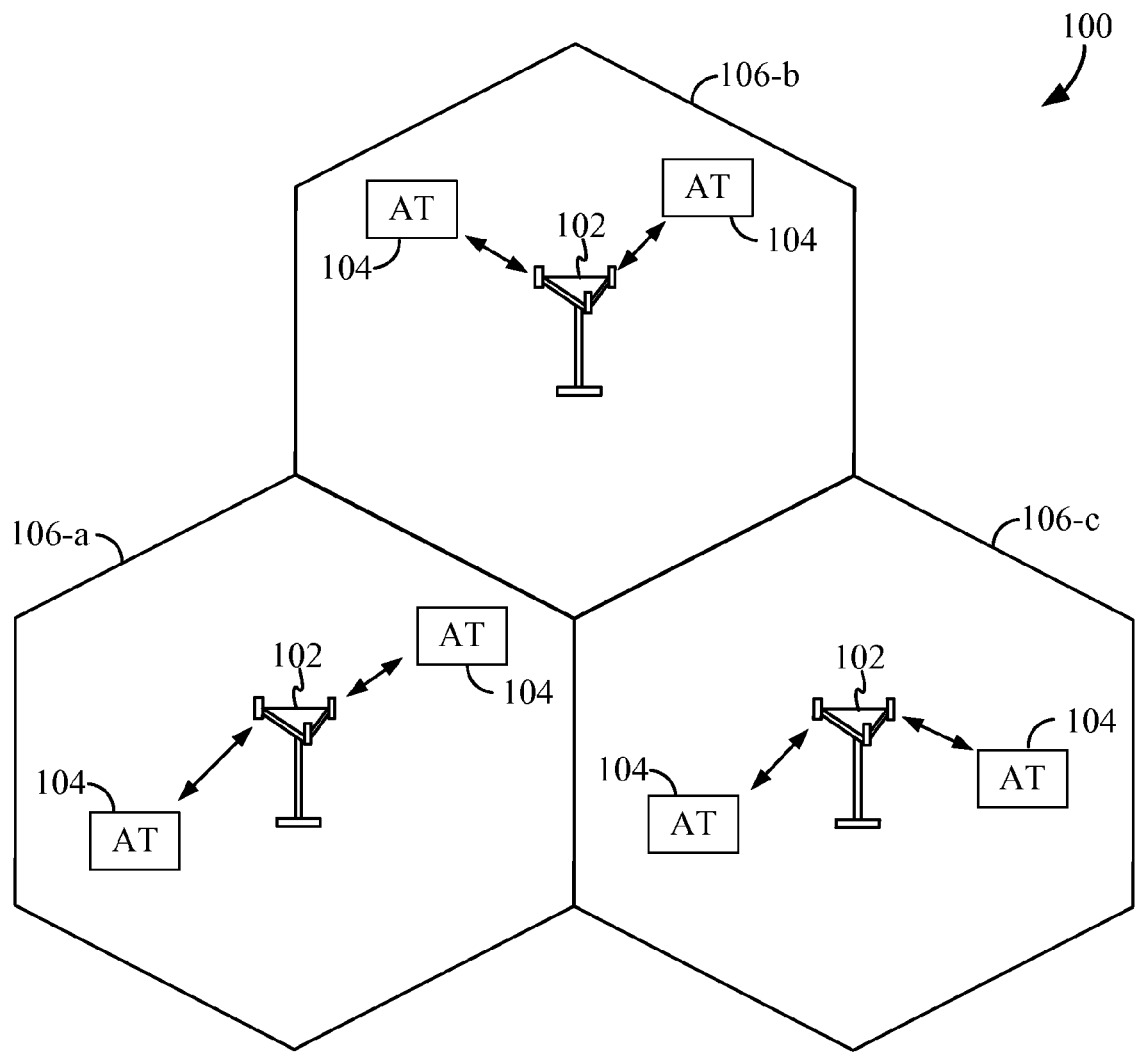
FIG. 1 is a block diagram of a network environment in which one or more aspects of the present disclosure may find application.

FIG. 1 is a block diagram of a network environment in which one or more aspects of the present disclosure may find application. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). The system 100 may include base stations 102 of different types (e.g., macro, micro, and/or pico base stations).

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a computer, a smartphone, a pager, a wireless modem, a personal digital assistant, a personal information manager (PIM), a personal media player, a palmtop computer, a laptop computer, a tablet computer, a television, an appliance, an entertainment device,0 an e-reader, a digital video recorder (DVR), a machine-to-machine (M2M) device, and/or other communication/computing device which communicates, at least partially, through a wireless or cellular network.

Figure 2:
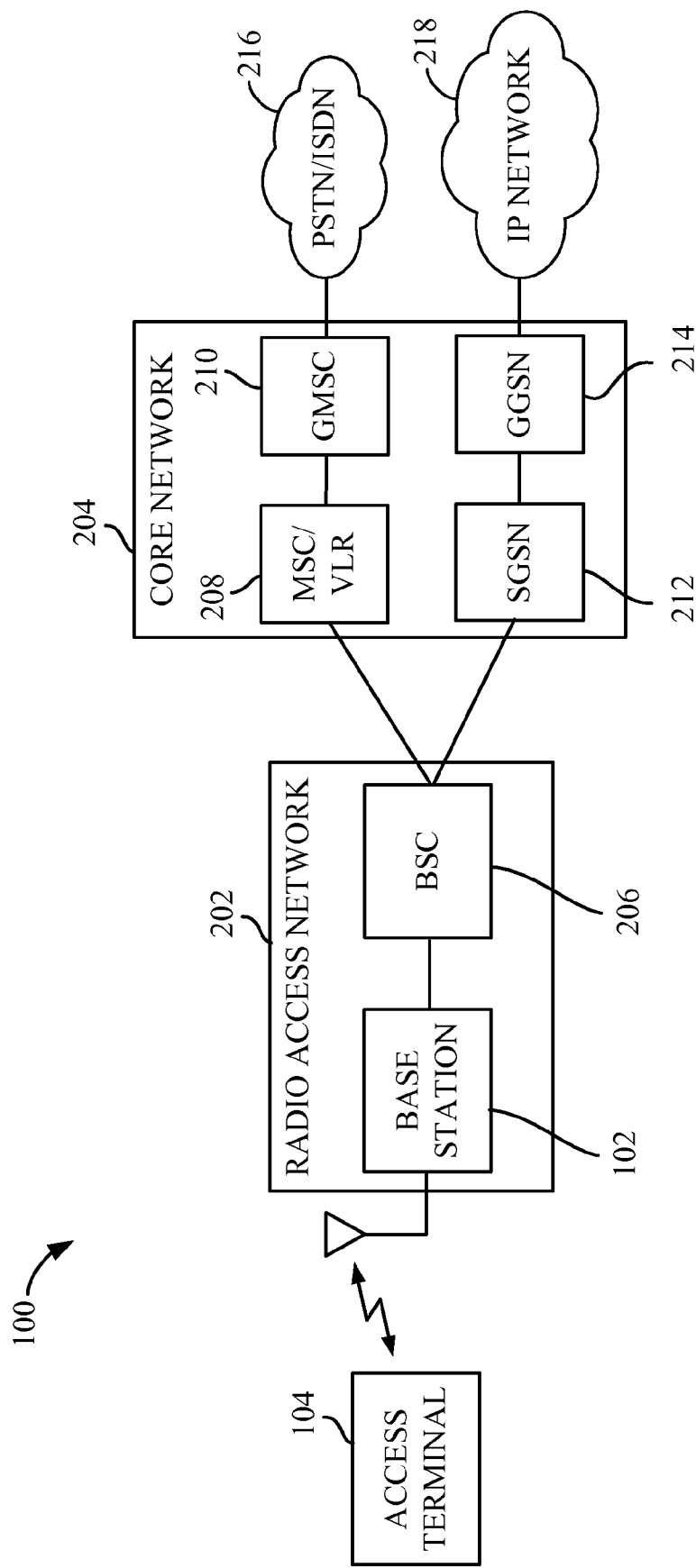
FIG. 2 is a block diagram illustrating select components of the wireless communication system of FIG. 1 according to some embodiments.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

As an access terminal 104 operates within the wireless communications system 100, the access terminal 104 typically obtains overhead messages corresponding to a pilot transmitted by a particular cell. Such overhead messages are generally broadcast on a periodic basis. For instance, in a wireless communications system 100 employing CDMA 2000 1x standards, the base stations 102 broadcast overhead messages over a paging channel (PCH) every 1.28 seconds. The overhead messages typically include one or more sequence numbers (e.g., 6-bit sequence numbers identified in 3GPP2 standards as CONFIG_MSG_SEQ and ACC_MSG_SEQ). The sequence numbers can be included in a general page message, which is transmitted at least once every 2 paging slots on the paging channel (PCH).

In many instances, a plurality of sequentially broadcasted overhead messages may be similar. That is, there may be no changes to the information associated with periodic overhead messages over a significant period of time. Typically, overhead messages including the same or similar information can employ common sequence numbers. The sequence numbers corresponds to a set of messages. When there is any change in one of the messages in a set, a corresponding sequence number is incremented. The access terminal 104 may be permitted to store overhead message information and ignore subsequent overhead messages having the sequence number to conserve battery power. The stored information, however, is considered to no longer be current if the access terminal 104 has not obtained a subsequent overhead message for more than 600 seconds (10 minutes), regardless of the sequence number. After the 600 second period expires without receiving any subsequent overhead message, conventional access terminals are adapted to obtain a subsequent overhead message and store the associated information again, even if the sequence numbers remain unchanged.

Since the periodic overhead messages are transmitted every 1.28 seconds, the access terminal 104 (e.g., a receiver) may be powered up for as long as 1.28 seconds to obtain an overhead message before entering a low-power state. As a result, the access terminal 104 can consume a significant amount of power to obtain overhead messages and keep the overhead message information current. Other periodic frequencies besides 1.28 seconds may be used in other embodiments. F In some instances, one or more of the access terminals 104 may be stationary or substantially stationary. One example of such stationary or substantially stationary access terminals 104 includes machine-to-machine (M2M) enabled access terminals 104. M2M enabled access terminals 104 are adapted to wirelessly communicate with one or more devices over the wireless communication system 100, at least substantially without user interaction. M2M access terminals 104 may comprise a communications device adapted to capture an event (e.g., a sensor that captures temperature, a meter to capture inventory level, etc.), which is relayed through the wireless communication system 100 to an application (e.g., software program), where the event data can be translated into meaningful information (e.g., temperature needs to be lowered/raised, items need to be restocked, etc.). By way of example and not limitation, an M2M access terminal 104 may include a thermostat, a water meter, a sprinkler system, a smart-meter, an appliance, etc.

Figure 3:
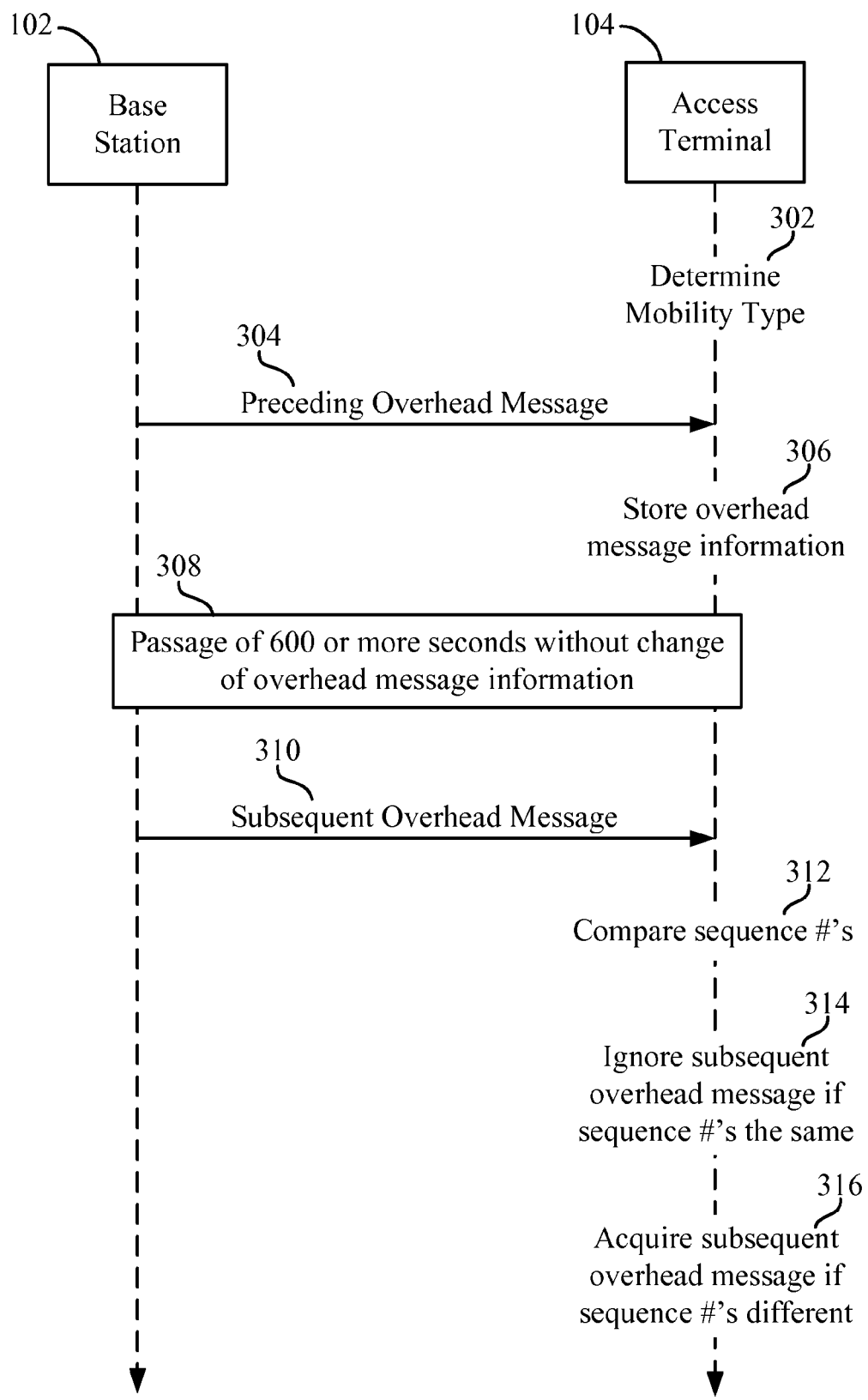
FIG. 3 is a block diagram illustrating access probes associated with a previous access attempt and an access probe associated with a subsequent access attempt, according to some embodiments.

M2M enabled access terminals may be relatively inactive with respect to wireless communications. As a result, M2M enabled access terminals often remain in a low-power or dormant state for relatively long periods of time, waking up occasionally to transmit event data over the wireless communications system. Furthermore, the stationary nature of such M2M enabled access terminals may result in a substantially low likelihood that the M2M will change between cells and/or sectors within a cell. According to one or more aspects of the present disclosure, access terminals that are at least substantially stationary are adapted to forego acquiring a new overhead message when consecutive overhead messages remain unchanged. FIG. 3 is a flow diagram illustrating an example for monitoring and updating overhead messages according to at least one example. In this example, a base station 102 and an access terminal 104 are illustrated.

Initially, the access terminal 104 can determine that its mobility type 302 is stationary or substantially stationary. This determination of a stationary or substantially stationary mobility type can indicate to the access terminal 104 that it may forgo acquiring overhead messages beyond the 600 second restriction as long as the sequence numbers remain unchanged. That is, since the access terminal 104 is at least substantially stationary, it is likely to receive the same pilot signal each time it wakes up, and it is likely that previously stored overhead message remain unchanged.

With a determination that the access terminal 104 is at least substantially stationary (i.e., has a stationary mobility type), the access terminal 104 can receive a preceding overhead message 304 broadcast by the base station 102. The access terminal 104 can store the information 306 associated with the preceding overhead message, including the sequence numbers corresponding to the preceding overhead message. With the overhead message information stored, the access terminal 104 may enter a low-power state to conserve power.

At 308, a period of six hundred (600) or more seconds may pass without any changes to the overhead message information. For instance, the access terminal 104 may receive overhead messages during this period 308 and may check the sequence numbers associated with the received overhead messages. As long as the sequence numbers remains unchanged, the access terminal 104 can ignore the overhead messages.

Following the duration of the six hundred (600) seconds without updating the overhead information, the access terminal 104 of the present disclosure can continue to monitor the sequence numbers of the received overhead messages to determine whether or not to update the overhead information. That is, in response to determining its mobility type to be stationary or substantially stationary, the access terminal 104 continues to determine whether to receive an overhead message based on the sequence numbers. For example, following the passage of the six hundred (600) or more seconds at 308, a subsequent overhead message 310 may be broadcast. The access terminal 104 can obtain the sequence numbers corresponding to the subsequent overhead message without receiving the rest of the subsequent overhead message. Since the access terminal 104 is stationary or substantially stationary, the access terminal 104 compares 314 the sequence numbers associated with the subsequent overhead message to the sequence numbers associated with the stored overhead message information. If the sequence numbers are the same, the access terminal 104 ignores 314 the subsequent overhead message. On the other hand, if the sequence numbers are different, the access terminal 104 can acquire 316 the overhead message and store the subsequent overhead message information.

In this example, the stationary or substantially stationary access terminal 104 can employ the sequence numbers beyond the conventional threshold of six hundred (600) seconds (e.g., indefinitely) for determining whether or not to obtain a subsequent overhead message. In other examples, an access terminal 104 may not be stationary. When an access terminal 104 is not stationary, the access terminal 104 may move to a location in which the pilot signal employed to transmit overhead messages is the same as the pilot signal from which the stored overhead message information was received, but the overhead messages may relate to different sectors. That is, the access terminal 104 may receive a nearby pilot signal employing the same frequency and pseudorandom number (PN) sequence as that used when receiving a preceding overhead message associated with stored information, but the received pilot signal may be associated with a different sector and may include different overhead message information. If the access terminal 104 relied solely on the sequence numbers in this example, the access terminal 104 would be unable to identify the different sectors and would skip updating for the new sector if the two pilot signals employ the same sequence numbers.

Figure 4:
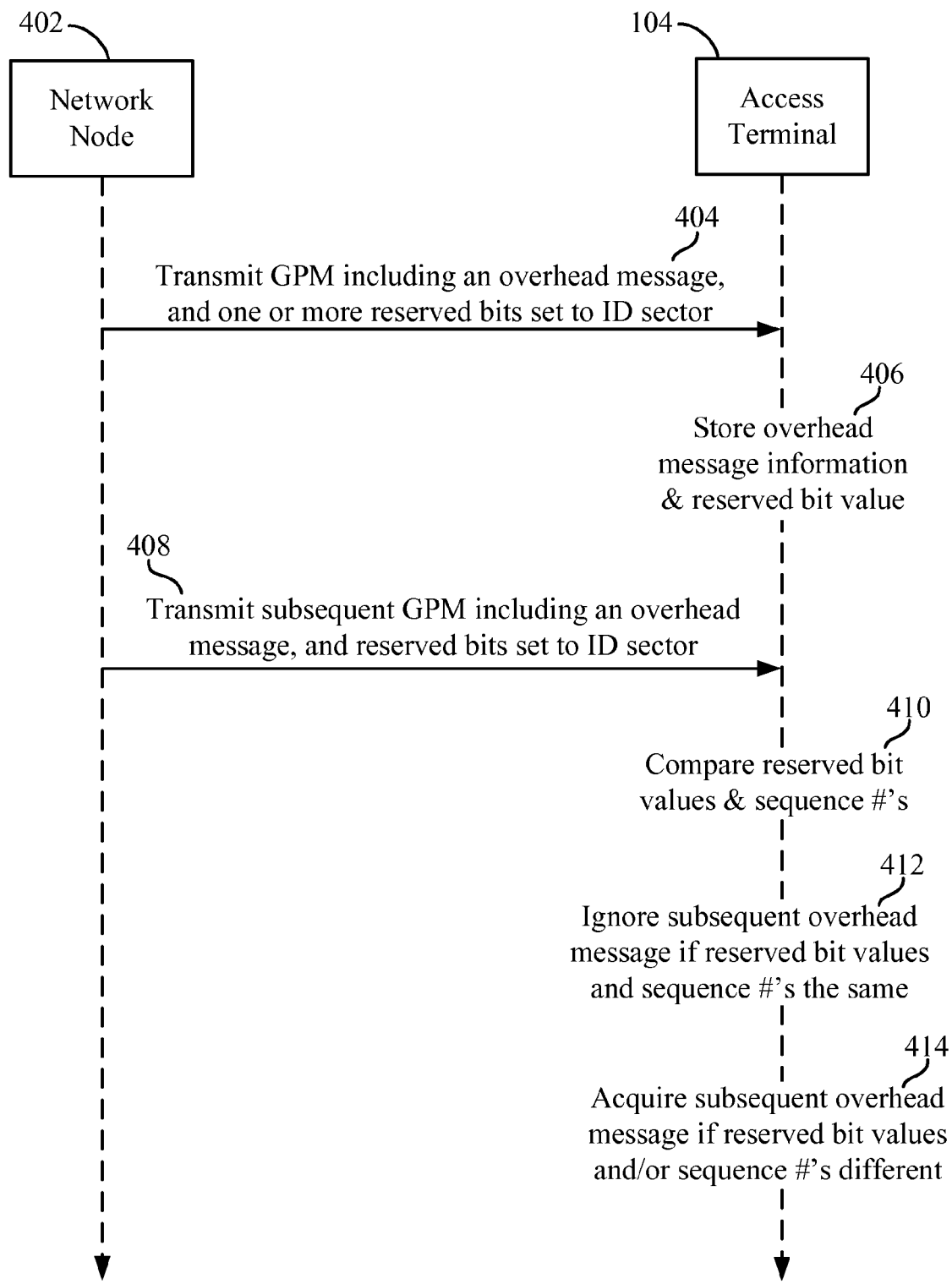
FIG. 4 is a flow diagram illustrating an example for facilitating access attempts while reducing power consumption at the access terminal according to some embodiments.

According to at least one aspect of the present disclosure, network nodes and access terminals can be adapted to differentiate between overhead messages received from two different sectors employing the same pilot (e.g., same frequency and PN). FIG. 4 is a flow diagram illustrating an example for monitoring and updating overhead messages according to at least one example where an access terminal may or may not be stationary. As shown, the access terminal 104 can communicate with a network node 402. The network node 402 may represent one or more network elements, such as a base station 102, a base station controller 206, and/or a MSC/VLR 208, which are illustrated in FIGS. 1 and 2.

Initially, a message 404 is transmitted by the network node 402 including an overhead message from a network node 402. As noted previously, the received overhead message includes one or more sequence numbers. In addition to the one or more sequence numbers associated with the overhead message, the message 404 also includes an indicator adapted to distinguish the message from similar messages associated with a different sector.

By way of example, the message 404 may be a general page message (GPM) typically employed for transmitting overhead messages in at least some wireless communications systems. The general page message typically includes a plurality of bits that are reserved for currently unassigned purposes. These bits are often referred to as "reserved bits". For example, in CDMA 2000 1x standards, a general page message employed to transmit an overhead message typically includes four (4) reserved bits. In one or more examples, the indicator adapted to distinguish the message 404 from similar messages associated with a different sector can be a value set for the one or more reserved bits of the general page message. For instance, the network node 402 can set one or more of the reserved bits to a value adapted to identify the particular sector associated with the general page message. After receipt of the general page message, the access terminal 104 can store 406 the overhead message information (e.g., sequence numbers associated with the overhead message) together with the indicator (e.g., the value of the reserved bits) adapted to identify the sector associated with the general page message.

A subsequent message, such as a subsequent general page message (GPM) 408, is transmitted on the same pilot (e.g., same frequency and PN) as the preceding message 404. The subsequent message 408 also includes an overhead message with one or more sequence numbers, and an indicator (e.g., one or more reserved bits set to a value) adapted to identify a particular sector associated with the general page message. According to various examples, the subsequent general page message 408 may be transmitted by the same network node 402 or a different network node 402 that sent the previous general page message 404.

The access terminal 104 can compare 312 the indicator (e.g., value of the reserved bits) in the subsequent general page message with the stored indicator (e.g., stored reserved bit value) associated with the stored overhead message information. The access terminal 104 can also compare 410 the sequence numbers in the overhead message of the subsequent general page message with the sequence numbers associated with the stored overhead message information. If the subsequent indicator (e.g., reserved bit value) and the subsequent sequence numbers are the same as the stored indicator and sequence numbers, then the access terminal 104 can ignore 412 the subsequent overhead message. On the other hand, if the compared indicators (e.g., reserved bit values) and/or the compared sequence numbers are different, then the access terminal 104 acquires the subsequent overhead message 414 in the subsequent general page message. For instance, if the compared indicators (e.g., reserved bit values) are different, then the access terminal 104 has likely received a general page message from a different sector employing the same pilot. In response to the different indicators (e.g., reserved bit values), the access terminal 104 obtains the overhead message information associated with the new sector. Similarly, if the compared sequence numbers are different, then the overhead message information has changed, as described above, and the access terminal 104 obtains the new overhead message.

Figure 5:
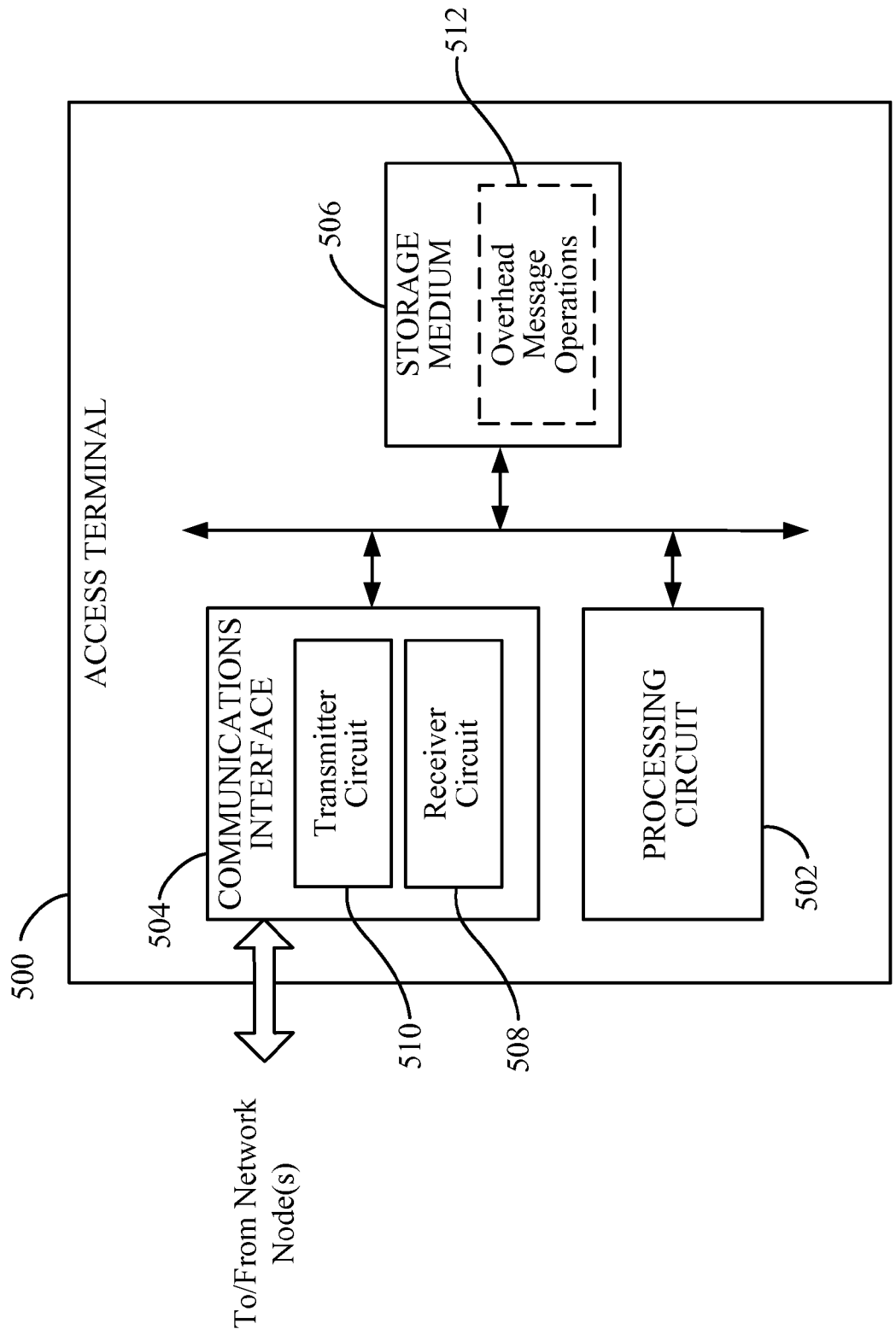
FIG. 5 is a block diagram illustrating select components of an access terminal according to some embodiments.

Turning to FIG. 5, a block diagram is shown illustrating select components of an access terminal 500 according to at least one example of the present disclosure. The access terminal 500 includes a processing circuit 502 coupled to or placed in electrical communication with a communications interface 504 and a storage medium 506.

The processing circuit 502 is arranged to obtain, process and/or send data, control data access and storage, issue commands, and control other desired operations. The processing circuit 502 may include circuitry adapted to implement desired programming provided by appropriate media in at least one example. For example, the processing circuit 502 may be implemented as one or more processors, one or more controllers, and/or other structure configured to execute executable programming. Examples of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 502 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 502 are for illustration and other suitable configurations within the scope of the present disclosure are also contemplated.

The processing circuit 502 is adapted for processing, including the execution of programming, which may be stored on the storage medium 506. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 504 is configured to facilitate wireless communications of the access terminal 500. For example, the communications interface 504 may include circuitry and/or programming adapted to facilitate the communication of information bi-directionally with respect to one or more wireless network devices (e.g., network nodes). The communications interface 504 may be coupled to one or more antennas (not shown), and includes wireless transceiver circuitry, including at least one receiver circuit 508 (e.g., one or more receiver chains) and/or at least one transmitter circuit 510 (e.g., one or more transmitter chains). In some scenarios, the receiver and transmitter may be stand-alone components while in others, they may be a unitary component.

The storage medium 506 may represent one or more computer-readable, machine-readable, and/or processor-readable devices for storing programming, such as processor executable code or instructions (e.g., software, firmware), electronic data, databases, or other digital information. The storage medium 506 may also be used for storing data that is manipulated by the processing circuit 502 when executing programming. The storage medium 506 may be any available media that can be accessed by a general purpose or special purpose processor, including portable or fixed storage devices, optical storage devices, and various other mediums capable of storing, containing and/or carrying programming. By way of example and not limitation, the storage medium 506 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 506 may be coupled to the processing circuit 502 such that the processing circuit 502 can read information from, and write information to, the storage medium 506. That is, the storage medium 506 can be coupled to the processing circuit 502 so that the storage medium 506 is at least accessible by the processing circuit 502, including examples where the storage medium 506 is integral to the processing circuit 502 and/or examples where the storage medium 506 is separate from the processing circuit 502 (e.g., resident in the access terminal 500, external to the access terminal 500, distributed across multiple entities).

Programming stored by the storage medium 506, when executed by the processing circuit 502, causes the processing circuit 502 to perform one or more of the various functions and/or process steps described herein. For example, the storage medium 506 may include overhead message operations 512 adapted to cause the processing circuit 502 to receive overhead messages, and compare sequence numbers and/or indicators (e.g., reserved bit values) of general page messages, as described herein. Thus, according to one or more aspects of the present disclosure, the processing circuit 502 is adapted to perform (in conjunction with the storage medium 506) any or all of the processes, functions, steps and/or routines for any or all of the access terminals (e.g., access terminal 104, access terminal 500) described herein. As used herein, the term "adapted" in relation to the processing circuit 502 may refer to the processing circuit 502 being one or more of configured, employed, implemented, and/or programmed (in conjunction with the storage medium 506) to perform a particular process, function, step and/or routine according to various features described herein.

Figure 6:
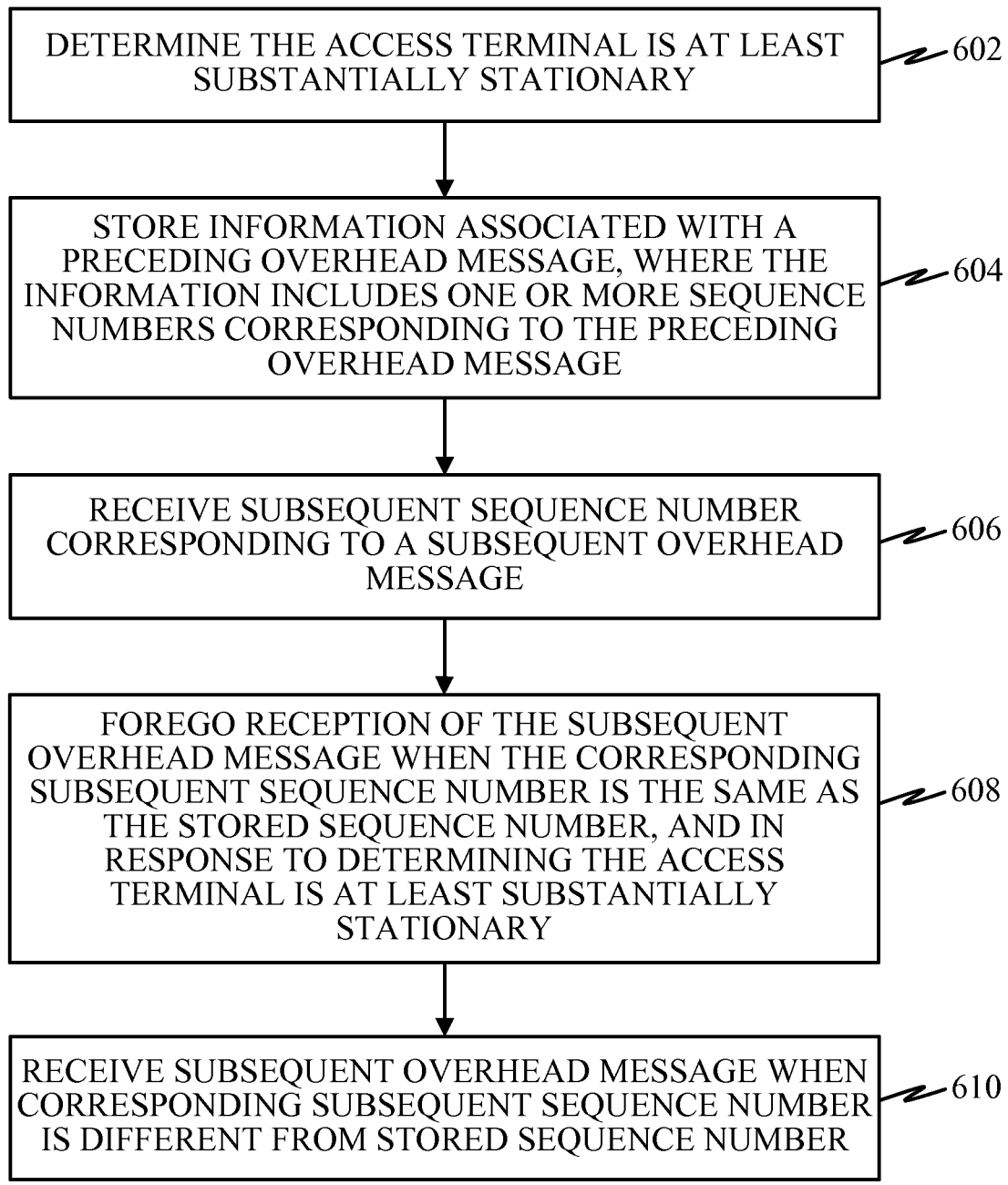
FIG. 6 is a flow diagram illustrating a method operational on an access terminal according to some embodiments.

FIG. 6 is a flow diagram illustrating at least one example of a method operational on an access terminal, such as the access terminal 500. Referring to FIGS. 5 and 6, an access terminal 500 can determine that it is at least substantially stationary at step 602. For example, the processing circuit 502 executing the overhead message operations 512 may determine whether the access terminal 500 is stationary or substantially stationary.

In some implementations, this determination may include the processing circuit 502 accessing pre-provisioned data (or pre-configured information) stored in the storage medium 506 and adapted to define a mobility type. The mobility type can be adapted to indicate to the processing circuit 502 that the access terminal 500 is at least substantially stationary.

In some implementations, the processing circuit 502 executing the overhead message operations 512 may store and review information relating to cell reselection procedures to determine how often cell reselection procedures have been conducted. The processing circuit 502 may also take into account whether previous cell reselections have been between a common group of the same cells (e.g., whether the access terminal 500 has only changed between the same two or three cells). According to various examples, the processing circuit 502 executing the overhead message operations 512 can determine the access terminal 500 is stationary or substantially stationary when there have been no cell reselections over the course of a predetermined period of time (e.g., a couple of days, a week, a month, etc.), and/or when previous cell reselections are limited to reselections between a common group of the same cells.

In some implementations, the processing circuit 502 executing the overhead message operations 512 may monitor a relative pilot signal strength of each of a plurality of neighboring cell. When the relative signal strength of one or more neighboring cells remains at least substantially the same for a predetermined duration of time (e.g., the difference in signal strength from one measurement to the next is less than some predefined threshold), the processing circuit 502 executing the overhead message operations 512 may conclude that the access terminal 500 is at least substantially stationary.

In some implementations, the processing circuit 502 executing the overhead message operations 512 may monitor a GPS location (e.g., via a GPS circuit (not shown) of the access terminal 500) to determine whether the access terminal 500 is mobile or at least substantially stationary. For example, the processing circuit 502 may monitor a GPS location at some predetermined frequency. When any change in GPS location is less than a predefined threshold, the processing circuit 502 executing the overhead message operations 512 may determine that the access terminal 500 is at least substantially stationary. Although various examples are described for determining the mobility of the access terminal 500, other examples may also be employed, as well as various combinations of two or more examples.

At step 604, the access terminal 500 can store information associated with a preceding overhead message. The information associated with the preceding overhead message includes one or more sequence numbers corresponding to the preceding overhead message. In one or more implementations, the processing circuit 502 executing the overhead message operations 512 can receive a preceding overhead message via the communications interface 504. On receipt of the preceding overhead message, the processing circuit 502 executing the overhead message operations 512 can store the information associated with the preceding overhead message in the storage medium 506.

At step 606, the access terminal 500 receives one or more subsequent sequence numbers corresponding to a subsequent overhead message. For example, the processing circuit 502 executing the overhead message operations 512 may obtain the one or more subsequent sequence numbers via the communications interface 504. Instead of receiving and/or processing the entire subsequent overhead message, the processing circuit 502 executing the overhead message operations 512 can obtain the one or more subsequent sequence numbers associated with the subsequent overhead message. In some instances, the access terminal 500 may wake from a low-power state in which one or more components of the access terminal 500 (e.g., at least a portion of the receiver circuit 508) are powered up from the low-power state to receive the subsequent sequence number when the subsequent overhead message is available for reception. In at least some implementations, the one or more subsequent sequence numbers corresponding to the subsequent overhead message may be received by the access terminal 500 at least six hundred (600) seconds after the preceding overhead message was received and the associated information stored in the storage medium 506.

At step 608, the access terminal 500 can forego reception of the subsequent overhead message when the one or more corresponding subsequent sequence numbers are the same as the one or more stored sequence numbers. For example, the processing circuit 502 executing the overhead message operations 512 may ignore the subsequent overhead message when the at least one corresponding subsequent sequence number is the same as the at least one stored sequence number. In one or more implementations, the processing circuit 502 executing the overhead message operations 512 can compare the value of the one or more obtained subsequent sequence numbers with the value of the one or more sequence numbers stored in the storage medium 506. If the two values are the same, the processing circuit 502 executing the overhead message operations 512 ignores the subsequent overhead message. For example, the processing circuit 502 executing the overhead message operations 512 can ignore the subsequent overhead message by entering a low-power state prior to receiving or completing reception of the subsequent overhead message.

As noted herein above, the sequence numbers for consecutive overhead messages remain the same until there is a change to the overhead message information. In response to the determination by the access terminal 500 that it is at least substantially stationary at step 602, the access terminal 500 can continue to ignore subsequent overhead messages with the corresponding subsequent sequence numbers that are the same as the sequence numbers corresponding to the stored overhead information more than six hundred (600) seconds from when the sequence numbers corresponding to the stored overhead information was received and stored, which six hundred (600) seconds is conventionally employed as a threshold or upper limit for ignoring a subsequent overhead message.

On the other hand, when the one or more subsequent sequence numbers are different from the one or more stored sequence numbers, the access terminal 500 can receive the subsequent overhead message at step 610. For example, as noted above, the processing circuit 502 executing the overhead message operations 512 can compare the value of the one or more obtained subsequent sequence numbers with the value of the one or more sequence numbers stored in the storage medium 506. If the two values are different, the processing circuit 502 executing the overhead message operations 512 can obtain the subsequent overhead message. That is, the processing circuit 502 executing the overhead message operations 512 may remain in a powered-up state to receive and process the subsequent overhead message prior to entering to a low-power state.

In the forgoing example, enabling the access terminal 500 to ignore subsequent overhead messages when the sequence numbers are the same as the sequence numbers for a previously received overhead message, even beyond six hundred (600) seconds, the access terminal 500 can significantly reduce the amount of time the receiver circuit 508 is powered up. For instance, the time during which the receiver circuit 508 and/or other components are powered up from a low-power state to receive the sequence numbers corresponding to an overhead message may be about 80 milliseconds. On the other hand, the time during which the receiver circuit 508 and/or other components are powered up to receive the overhead message may be about 1.28 seconds. Accordingly, enabling the access terminal 500 to enter a low-power state after determining that the subsequent sequence numbers are the same as the stored sequence numbers can result in significant power savings by the access terminal 500.

Figure 7:
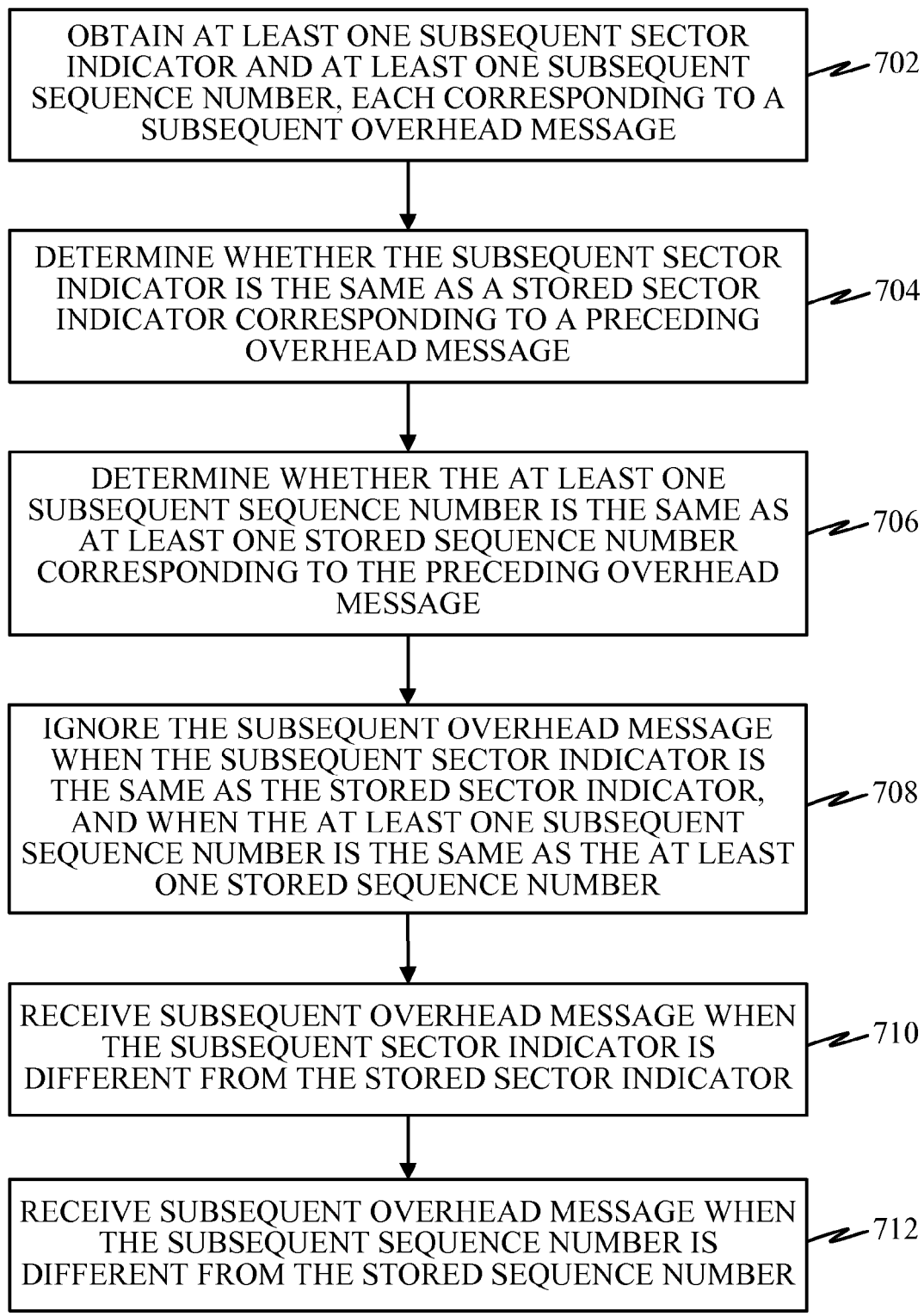
FIG. 7 is a block diagram illustrating select components of a network node according to some embodiments.

Turning to FIG. 7, a flow diagram is shown illustrating at least one other example of a method operational on an access terminal, such as the access terminal 500. With reference to FIGS. 5 and 7, an access terminal 500 can obtain at least one subsequent sector indicator corresponding to a subsequent overhead message, and at least one subsequent sequence number corresponding to the subsequent overhead message at step 702. For example, the processing circuit 502 executing the overhead message operations 512 can receive, via the communications interface 504, at least one sector indicator and at least one sequence number associated with a subsequent overhead message. The processing circuit 502 executing the overhead message operations 512 can receive the at least one subsequent sector indicator and at least one subsequent sequence number prior to receiving the rest of the subsequent overhead message. In one or more implementations, the sector indicator may be included in a general page message (GPM). In at least some examples, the sector indicator may comprise one or more bits of the general page message (GPM) commonly identified as "reserved bits." The general page message also includes the subsequent overhead message with its one or more corresponding subsequent sequence numbers.

In this example, the access terminal 500 determines whether to receive the rest of the subsequent overhead message based on the subsequent sector indicator and the subsequent sequence numbers. It is assumed that the access terminal 500 has previously received a preceding overhead message and stored information associated with the preceding overhead message in the storage medium 506, including a corresponding sector indicator and at least one corresponding sequence number. At step 704, the access terminal 500 determines whether the subsequent sector indicator is the same as the stored sector indicator corresponding to the preceding overhead message. For example, the processing circuit 502 executing the overhead message operations 512 can determine whether the subsequent sector indicator is the same as the sector indicator stored in the storage medium 506. In at least one implementation, the processing circuit 502 executing the overhead message operations 512 can make this determination by comparing the subsequent sector indicator to the stored sector indicator. In implementations in which the sector indicator comprises a value of one or more reserved bits in a general page message, the processing circuit 502 executing the overhead message operations 512 can make the determination by comparing the value of the at least one subsequent reserved bit to the value of the at least one reserved bit stored in the storage medium 506.

At step 706, the access terminal 500 determines whether the at least one subsequent sequence number is the same as at least one stored sequence number. For example, the processing circuit 502 executing the overhead message operations 512 can determine whether the one or more subsequent sequence numbers are the same as the one or more sequence numbers stored in the storage medium 506. In at least one implementation, the processing circuit 502 executing the overhead message operations 512 can make this determination by comparing the value of the at least one subsequent sequence number to the at least one sequence number stored in the storage medium 506.

At step 708, when the subsequent sector indicator corresponding to the subsequent overhead message is the same as the stored sector indicator corresponding to the preceding overhead message, and when the at least one subsequent sequence number is the same as the at least one stored sequence number, the access terminal 500 can ignore the subsequent overhead message. For example, the processing circuit 502 executing the overhead message operations 512 can forgo receiving the subsequent overhead message when it is determined from step 704 that the subsequent sector indicator (e.g., the value of the at least one subsequent reserved bit) included with the subsequent overhead message is the same as the stored sector indicator (e.g., the value of the at least one reserved bit) corresponding to the preceding overhead message, and when it is determined from step 706 that the at least one subsequent sequence number is the same as the at least one stored sequence number. In at least one implementation, the processing circuit 502 executing the overhead message operations 512 may ignore the subsequent overhead message by entering a low-power state prior to receiving or completing reception of the subsequent overhead message.

As noted previously herein, the sector indicator can be employed to distinguish between general page messages sent by two different sectors employing the same pilot. Accordingly, if the subsequent sector indicator is different from the sector indicator stored in the storage medium 506, the access terminal 500 can receive the subsequent overhead message at step 710. For example, the processing circuit 502 executing the overhead message operations 512 can receive the subsequent overhead message via the communications interface 504 when it is determined from step 704 that the value of the subsequent sector indicator (e.g., the at least one subsequent reserved bit) included with the subsequent overhead message is different from the stored sector indicator (e.g., the stored value of the at least on reserved bit) corresponding to the preceding overhead message. The difference between these two sector indicators signifies that the preceding overhead message and the subsequent overhead message correspond to different sectors. Since the subsequent overhead message is associated with a new sector, the processing circuit 502 executing the overhead message operations 512 can store the information associated with the subsequent overhead message in the storage medium 506.

As noted previously herein, the sequence numbers associated with overhead messages can indicate whether the overhead message information has changed. Accordingly, when the subsequent sequence number is different from the stored sequence number, the access terminal 500 can receive the subsequent overhead message at step 712. For example, the processing circuit 502 executing the overhead message operations 512 can receive the subsequent overhead message via the communications interface 504 when it is determined from step 706 that the at least one subsequent sequence number is different from the at least one stored sequence number. The processing circuit 502 executing the overhead message operations 512 can also store the information from the subsequent overhead message in the storage medium 506.

Figure 8:
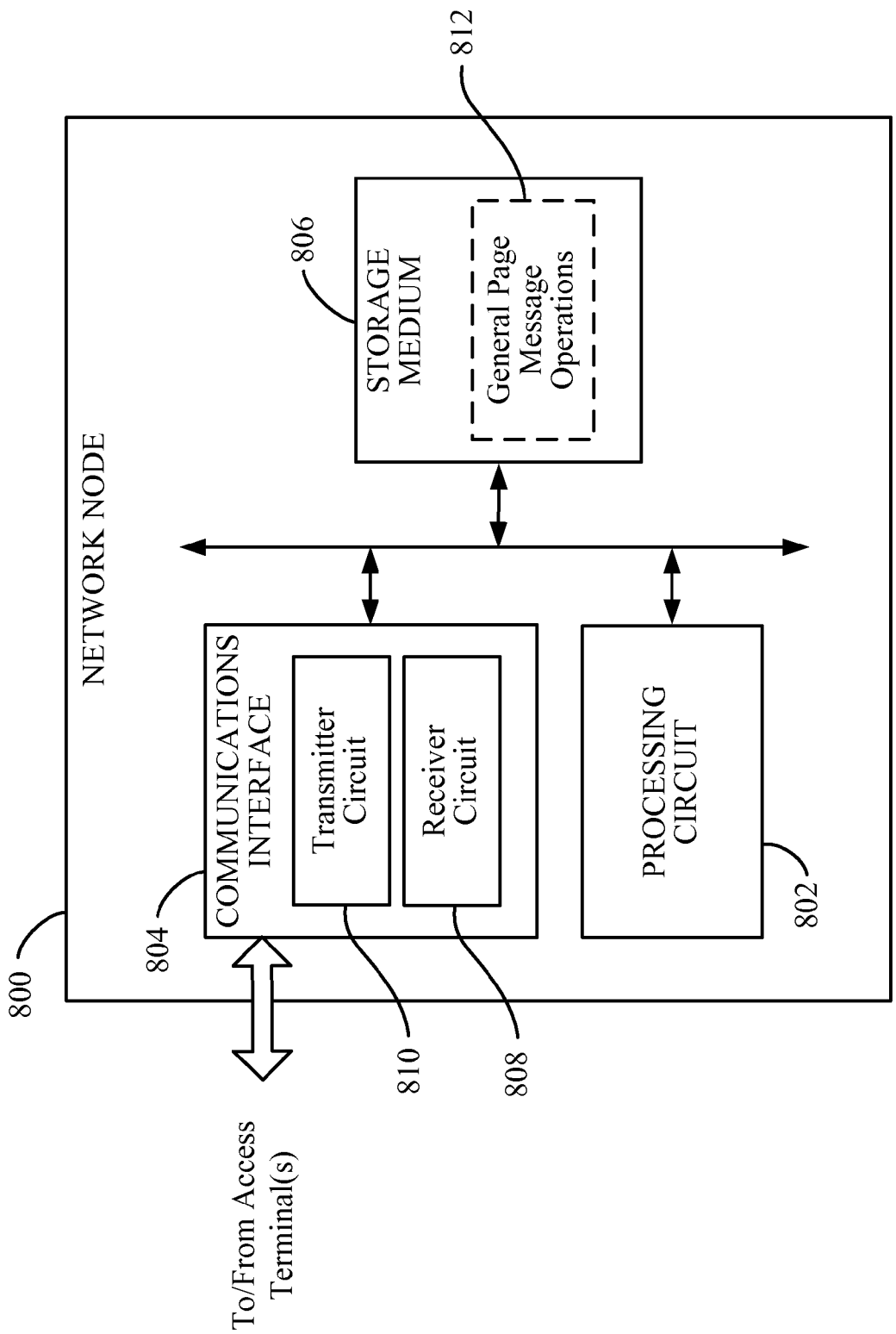
FIG. 8 is a flow diagram illustrating a method operational on a network node according to some embodiments.

Turning to FIG. 8, a block diagram is shown illustrating select components of a network node 800 according to at least one example. The network node 800 may include a processing circuit 802 coupled to or placed in electrical communication with a communications interface 804 and a storage medium 806.

The processing circuit 802 is arranged to obtain, process and/or send data, control data access and storage, issue commands, and control other desired operations. The processing circuit 802 may include circuitry configured to implement desired programming provided by appropriate media in at least one example, and may be implemented and/or adapted according to any of the examples of the processing circuit 502 described above.

The communications interface 804 is configured to facilitate wireless communications of the network node 800. For example, the communications interface 804 may include circuitry and/or programming adapted to facilitate the communication of information bi-directionally with respect to one or more access terminals. The communications interface 804 may be coupled to one or more antennas (not shown), and includes wireless transceiver circuitry, including at least one receiver circuit 808 (e.g., one or more receiver chains) and/or at least one transmitter circuit 810 (e.g., one or more transmitter chains).

The storage medium 806 may represent one or more computer-readable, machine-readable, and/or processor-readable devices for storing programming, such as processor executable code or instructions (e.g., software, firmware), electronic data, databases, or other digital information. The storage medium 806 may be configured and/or implemented in a manner similar to the storage medium 506 described above.

The storage medium 806 may be coupled to the processing circuit 802 such that the processing circuit 802 can read information from, and write information to, the storage medium 806. That is, the storage medium 806 can be coupled to the processing circuit 802 so that the storage medium 806 is at least accessible by the processing circuit 802, including examples where the storage medium 806 is integral to the processing circuit 802 and/or examples where the storage medium 806 is separate from the processing circuit 802 (e.g., resident in the network node 800, external to the network node 800, distributed across multiple entities).

Like the storage medium 506, the storage medium 806 includes programming stored thereon. The programming stored by the storage medium 806, when executed by the processing circuit 802, causes the processing circuit 802 to perform one or more of the various functions and/or process steps described herein. For example, the storage medium 806 may include general page message operations 812 adapted to cause the processing circuit 802 to generate and send general page messages including at least one reserved bit set to a value adapted to distinguish the general page message from general page messages associated with another sector. Thus, according to one or more aspects of the present disclosure, the processing circuit 802 is adapted to perform (in conjunction with the storage medium 806) any or all of the processes, functions, steps and/or routines for any or all of the network nodes described herein (e.g., base station 102, base station controller 206, MSC/VLR 208, and/or network node 402 in FIGS. 1-4). As used herein, the term "adapted" in relation to the processing circuit 802 may refer to the processing circuit 802 being one or more of configured, employed, implemented, and/or programmed to perform a particular process, function, step and/or routine according to various features described herein.

Figure 9:
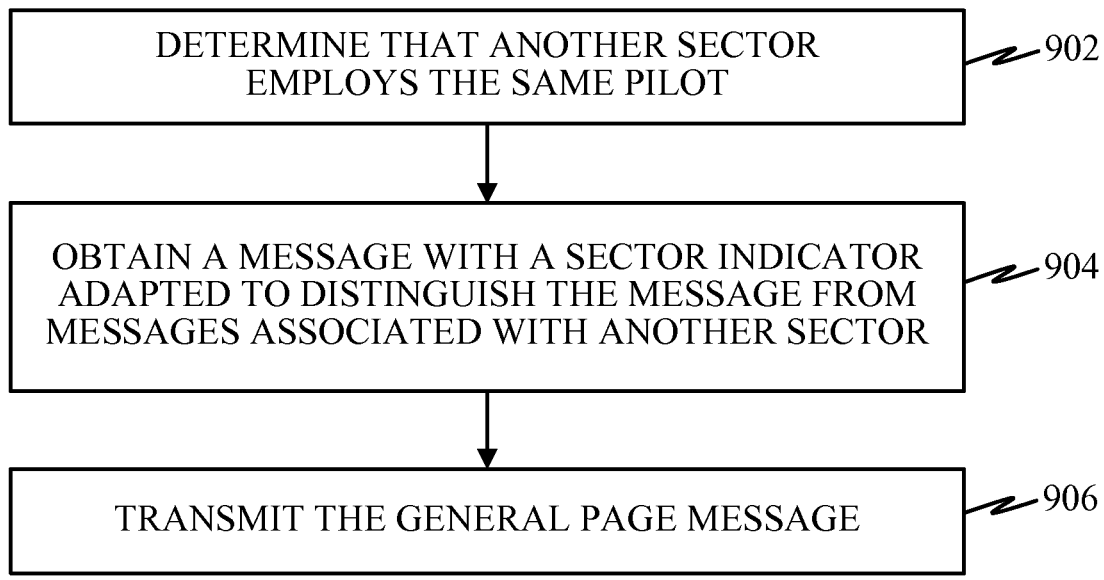
FIG. 9 is a flow diagram illustrating at least one example of a method operational on a network node according to some embodiments of the present invention.

FIG. 9 is a flow diagram illustrating at least one example of a method operational on a network node, such as the network node 800. Referring to FIGS. 8 and 9, a network node 800 may determine that another sector is employing the same pilot for transmitting overhead messages at step 902. For example, the processing circuit 802 executing the general page message operations 812 may determine that another sector is employing the same pilot (e.g., same frequency and pseudo-random number (PN) sequence) that is being employed by the network node 800. In at least one example, the network may inform the network node 800 that another network node is employing the same pilot.

At step 904, the network node 800 can obtain a message with sector indicator adapted to distinguish the message from messages associated with the other sector. For example, the processing circuit 802 executing the general page message operations 812 can obtain a message with the sector indicator. The processing circuit 802 executing the general page message operations 812 may generate the message or the message may be received from another network entity via the communications interface 804. The message may be a general page message (GPM). The sector indicator can include at least one reserved bit of the message (e.g., the general page message) set to a value adapted to distinguish the message (e.g., the general page message) from messages (e.g., general page messages) associated with the other sector, even though the other sector employs the same pilot. The message can also include an overhead message with one or more corresponding sequence numbers.

At step 906, the network node 800 can transmit the message. For example, the processing circuit 802 executing the general page message operations 812 can transmit the message via the communications interface 804. As noted above, the message is transmitted on the pilot, which is the same pilot employed by the other sector.

One or more of the above aspects and features may enable an access terminal to reduce the frequency of obtaining overhead message information when the information is unchanged over a period of time. Such aspects and features can improve power conservation in access terminals and may result in prolonged battery life.

While the above discussed aspects, arrangements, and embodiments are discussed with specific details and particularity, one or more of the components, steps, features and/or functions illustrated in FIGS. 1, 2, 3, 4, 5, 6, 7, 8 and/or 9 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 5 and/or 8 may be configured to perform or employ one or more of the methods, features, parameters, and/or steps described in FIGS. 3, 4, 6, 7 and/or 9. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
a communications interface;
a non-transitory storage medium comprising a sector indicator corresponding to a preceding overhead message, and at least one sequence number corresponding to the preceding overhead message; and
a processing circuit coupled to the communications interface and the storage medium, the processing circuit configured to:
receive, via the communications interface, a subsequent sector indicator and at least one subsequent sequence number, each corresponding to a subsequent overhead message, wherein the subsequent sector indicator comprises a value for at least one reserved bit in a general page message including the subsequent overhead message;
determine whether a value of the subsequent sector indicator is the same as the value of the sector indicator stored in the storage medium;
determine whether the at least one subsequent sequence number is the same as the at least one sequence number stored in the storage medium; and
ignore the subsequent overhead message when the subsequent sector indicator is the same as the sector indicator stored in the storage medium, and when the at least one subsequent sequence number is the same as the at least one sequence number stored in the storage medium.

2. The access terminal of claim 1, wherein the processing circuit is further configured to: obtain the subsequent overhead message when the subsequent sector indicator is different from the sector indicator stored in the non-transitory storage medium.

3. The access terminal of claim 1, wherein the processing circuit is further configured to: obtain the subsequent overhead message when the at least one subsequent sequence number is different from the at least one sequence number stored in the non-transitory storage medium.

4. A method of processing a general page message, the method comprising:
receiving a general page message including a subsequent sector indicator as a value for at least one reserved bit of the general page message;
obtaining the subsequent sector indicator and at least one subsequent sequence number from the general page message, each corresponding to a subsequent overhead message;
determining whether the subsequent sector indicator is the same as a stored sector indicator;
determining whether the at least one subsequent sequence number is the same as at least one stored sequence number; and
ignoring the subsequent overhead message when the subsequent sector indicator is the same as the stored sector indicator, and when the at least one subsequent sequence number is the same as the at least one stored sequence number.

5. The method of claim 4, further comprising:
prior to obtaining the subsequent sector indicator and the at least one subsequent sequence number, receiving a preceding overhead message comprising the stored sector indicator and the at least one stored sequence number; and
storing the stored sector indicator and the at least one stored sequence number.

6. The method of claim 4, wherein the general page message comprises the subsequent overhead message.

7. The method of claim 4, wherein determining whether the subsequent sector indicator is the same as the stored sector indicator comprises:
determining whether the value for the at least one reserved bit corresponding to the subsequent overhead message is the same as a stored value of at least one reserved bit corresponding to a preceding overhead message.

8. The method of claim 4, further comprising:
receiving the subsequent overhead message when the subsequent sector indicator is different from the stored sector indicator.

9. The method of claim 4, further comprising:
receiving the subsequent overhead message when the at least one subsequent sequence number is different from the at least one stored sequence number.

10. An access terminal, comprising:
    means for receiving a general page message including a subsequent sector indicator as a value for at least one reserved bit of the general page message;
    means for obtaining the subsequent sector indicator and at least one subsequent sequence number from the general page message, each corresponding to a subsequent overhead message;
    means for determining whether the subsequent sector indicator is the same as a stored sector indicator;
    means for determining whether the at least one subsequent sequence number is the same as at least one stored sequence number; and
    means for ignoring the subsequent overhead message when the subsequent sector indicator is the same as the stored sector indicator, and when the at least one subsequent sequence number is the same as the at least one stored sequence number.

11. The access terminal of claim 10, wherein:
    the subsequent sector indicator comprises a value for at least one reserved bit corresponding to the subsequent overhead message; and
    the stored sector indicator comprises a value for at least one reserved bit corresponding to a preceding overhead message.

12. The access terminal of claim 10, further comprising:
    means for receiving the subsequent overhead message when the subsequent sector indicator is different from the stored sector indicator.

13. The access terminal of claim 10, further comprising:
    means for receiving the subsequent overhead message when the at least one subsequent sequence number is different from the at least one stored sequence number.

14. A non-transitory computer-readable storage medium storing instructions that when executed by a computer perform the following:
    receive a general page message including a subsequent sector indicator as a value for at least one reserved bit of the general page message;
    obtain the subsequent sector indicator and at least one subsequent sequence number from the general page message, each corresponding to a subsequent overhead message;
    determine whether the subsequent sector indicator is the same as a stored sector indicator;
    determine whether the at least one subsequent sequence number is the same as at least one stored sequence number; and
    ignore the subsequent overhead message when the subsequent sector indicator is the same as the stored sector indicator, and when the at least one subsequent sequence number is the same as the at least one stored sequence number.

15. The non-transitory computer-readable storage medium of claim 14, wherein:
    the subsequent sector indicator comprises a value for at least one reserved bit corresponding to the subsequent overhead message; and
    the stored sector indicator comprises a value for at least one reserved bit corresponding to a preceding overhead message.

16. The non-transitory computer-readable storage medium of claim 14, further comprising programming for causing a computer to:
    receive the subsequent overhead message when the subsequent sector indicator is different from the stored sector indicator.

17. The non-transitory computer-readable storage medium of claim 14, further comprising programming for causing a computer to:
    receive the subsequent overhead message when the at least one subsequent sequence number is different from the at least one sequence number stored in the storage medium.

18. A network node, comprising:
    a communications interface;
    a non-transitory storage medium comprising general page message operations; and
    a processing circuit coupled to the communications interface and the non-transitory storage medium, the processing circuit configured to perform the general page message operations comprising:
    generate a general page message including a sector indicator configured to distinguish the general page message from messages associated with another sector, wherein the sector indicator comprises a value for at least one unassigned reserved bit in the general page message; and
    transmit the general page message via the communications interface.

19. The network node of claim 18, wherein the value of the sector indicator is configured to distinguish the general page message from messages associated with another sector.

20. The network node of claim 18, wherein the general page message includes an overhead message comprising one or more corresponding sequence numbers.

21. The network node of claim 18, wherein the processing circuit is configured to perform the general page message operations comprising: transmit the general page message on a pilot, wherein the pilot is the same pilot employed by the other sector.

22. The network node of claim 21, wherein the processing circuit is configured to perform the general page message operations comprising: determine that the other sector employs the same pilot before the general page message is generated.

23. A method of processing a general page message at a network node, comprising:
    generating a general page message comprising a sector indicator configured to distinguish the general page message from messages associated with another sector, wherein the sector indicator comprises a value for at least one unassigned reserved bit in the general page message; and
    transmitting the general page message.

24. The method of claim 23, wherein the value of the sector indicator distinguishes the general page message from messages associated with another sector.

25. The method of claim 23, wherein the general page message comprises an overhead message with one or more corresponding sequence numbers.

26. The method of claim 23, wherein transmitting the general page message comprises: transmitting the general page message on a pilot, wherein the pilot is the same pilot employed by the other sector.

27. The method of claim 26, further comprising: determining that the other sector employs the same pilot prior to generating the general page message.

28. A network node, comprising:
    means for generating a general page message comprising a sector indicator configured to distinguish the general page message from messages associated with another sector, wherein the sector indicator comprises a value for at least one unassigned reserved bit in the general page message; and means for transmitting the general page message.

29. The network node of claim 28, wherein the value of the sector indicator is configured to distinguish the general page message from messages associated with another sector.

30. The network node of claim 28, wherein the general page message comprises an overhead message comprising one or more corresponding sequence numbers.

* * * * *